(12) United States Patent  (10) Patent No.: US 9,354,505 B2
Jang  (45) Date of Patent: May 31, 2016

(54) DIGITAL PHOTOGRAPHING APPARATUS FOR DISPLAYING PANORAMIC IMAGES AND METHOD OF CONTROLLING THE SAME

(75) Inventor: Jae-young Jang, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 412 days.

(21) Appl. No.: 13/549,763

(22) Filed: Jul. 16, 2012

(65) Prior Publication Data

US 2013/0050403 A1 Feb. 28, 2013

(30) Foreign Application Priority Data

Aug. 30, 2011 (KR) .................. 10-2011-0087194

(51) Int. Cl.
*H04N 5/232* (2006.01)
*G03B 37/02* (2006.01)

(52) U.S. Cl.
CPC ............ *G03B 37/02* (2013.01); *H04N 5/23216* (2013.01); *H04N 5/23293* (2013.01)

(58) Field of Classification Search
CPC . H04N 5/23238; H04N 5/23293; G03B 37/02
See application file for complete search history.

(56) References Cited

U.S. PATENT DOCUMENTS

| | | |
|---|---|---|
| 6,867,801 B1 | 3/2005 | Akasawa et al. |
| 2010/0239223 A1* | 9/2010 | Oisel ................... H04N 1/2112 386/239 |
| 2010/0245540 A1* | 9/2010 | Fukuzawa .............. G03B 17/28 348/36 |
| 2010/0277496 A1* | 11/2010 | Kawanishi ............ G06F 3/0485 345/589 |
| 2011/0234852 A1* | 9/2011 | Ishida ................ H04N 5/23238 348/231.99 |
| 2011/0242274 A1* | 10/2011 | Yamaji ............... H04N 5/23238 348/36 |
| 2012/0169840 A1* | 7/2012 | Yamashita ............. H04N 5/232 348/36 |
| 2012/0182400 A1* | 7/2012 | Yamashita ............. G03B 35/02 348/50 |

FOREIGN PATENT DOCUMENTS

JP 2007-316982 A 12/2007
KR 10-0615988 B1 8/2006

OTHER PUBLICATIONS

Pitt, "Sony Cyber-Shot DSC-TX7 review," <http://www.alphr.com/sony/sony-cyber-shot-dsc-tx7/30947/sony-cyber-shot-dsc-tx7-review>, Jul. 30, 2010, 13 pages.

* cited by examiner

*Primary Examiner* — Jefferey Harold
*Assistant Examiner* — Sean Haiem
(74) *Attorney, Agent, or Firm* — Drinker Biddle & Reath LLP

(57) ABSTRACT

A digital photographing apparatus for displaying a panoramic image and a method of controlling the digital photographing apparatus are disclosed. A digital photographing apparatus is provided that includes a digital signal processor that displays at least a portion of a panoramic image as a sequence of images, wherein the sequence of images represent a moving region set in the panoramic image by a user. Because the panoramic image is displayed as a sequence of images to a desired spot, the user may more easily identify the panoramic image. In addition, by adjusting a slide reproduction speed, the sequence of images may be displayed to a desired spot and at a desired speed.

19 Claims, 12 Drawing Sheets

(a-1)  (a-2)  (a-3)

(h-1)  (h-2)

(a-1)　　　　　　　　　(a-2)

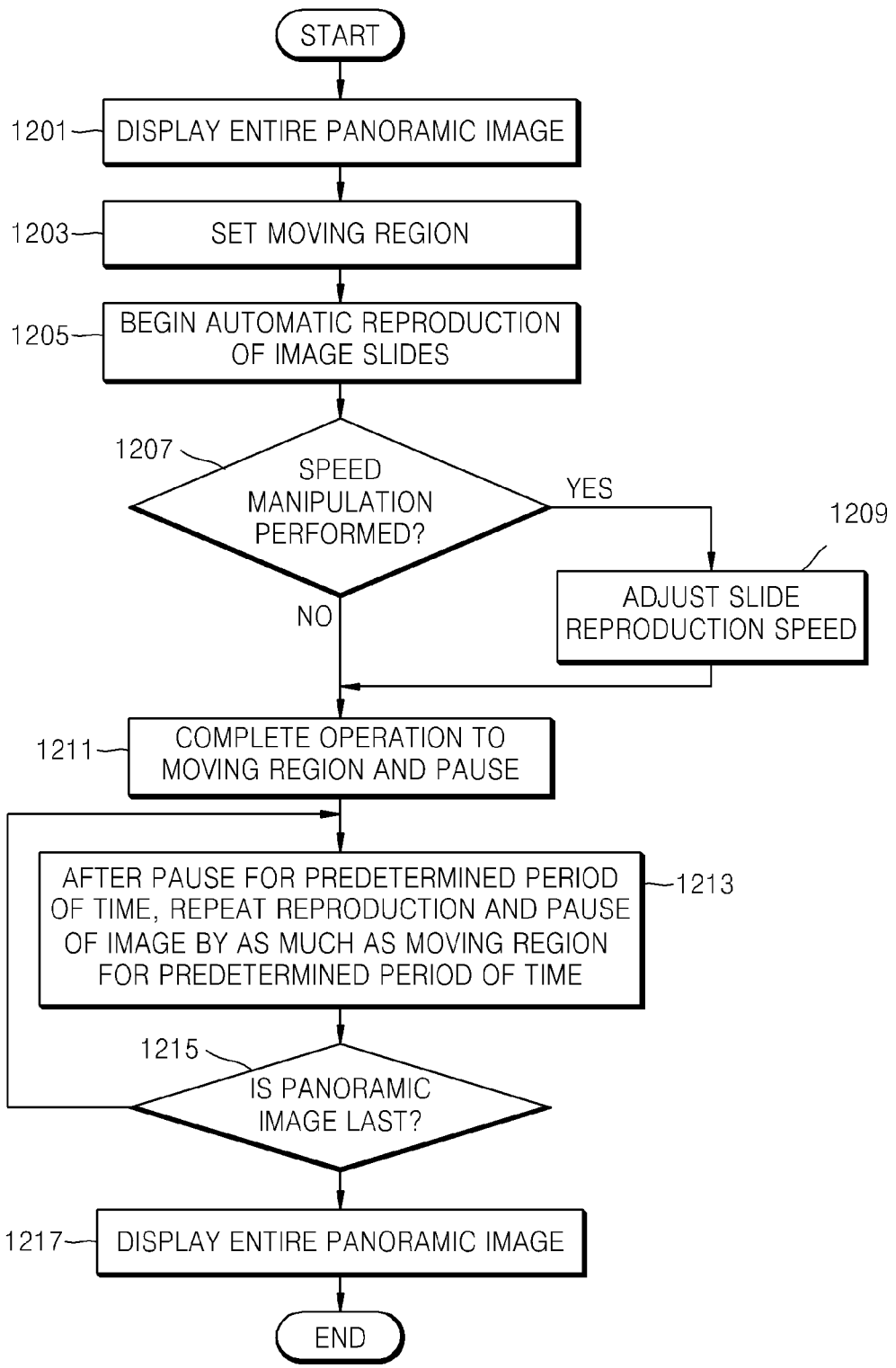

DIGITAL PHOTOGRAPHING APPARATUS FOR DISPLAYING PANORAMIC IMAGES AND METHOD OF CONTROLLING THE SAME

CROSS-REFERENCE TO RELATED PATENT APPLICATION

This application claims the priority benefit of Korean Patent Application No. 10-2011-0087194, filed on Aug. 30, 2011, in the Korean Intellectual Property Office, the entirety of which is incorporated herein by reference.

BACKGROUND

1. Field of the Invention

The invention relates to a digital photographing apparatus for displaying panoramic images and a method of controlling the digital photographing apparatus.

2. Description of the Related Art

A digital photographing apparatus may include a panoramic photographing function for capturing an image with a larger field of view than is conventional. A panoramic image that is captured using the panoramic photographing function is horizontally and/or vertically longer than a conventional image. A panoramic images is typically reviewed by scrolling through the panoramic image using key or touch manipulations. However, it may take a long period of time to display a panoramic image and the entire panoramic image is shown regardless of the importance of subjects in the panoramic image.

SUMMARY

The invention provides a digital photographing apparatus and a method of controlling the digital photographing apparatus, by which a panoramic image is more easily identified by automatically displaying image slides to a desired spot in the panoramic image.

According to an aspect of the invention, there is provided a digital photographing apparatus including a digital signal processor that displays at least a portion of a panoramic image as a sequence of images, wherein the sequence of images represent a moving region set in the panoramic image.

The digital signal processor may pause display of the sequence of images for a predetermined period of time.

The digital signal processor may pause display of the sequence of images for a predetermined period of time, and repeat displaying the sequence of images after the predetermined period of time elapses.

The moving region may be from a first image to a user-defined spot in the image.

The moving region may be from a first user-defined spot to a second user-defined spot in the image.

The digital signal processor may receive a touch signal, and set the moving region according to the touch signal.

The digital signal processor may receive a button input signal, and set the moving region according to the button input signal.

The digital signal processor may receive an adjustment signal, and adjust a display speed of the sequence of images according to the adjustment signal.

The digital signal processor may include a setting unit that sets the moving region in the image in response to a user input, and a slide reproducing unit that reproduces the sequence of images.

The digital photographing apparatus may further include a pause unit that pauses display of the sequence of images for a predetermined period of time.

The digital photographing apparatus may further include a speed adjusting unit that adjusts a reproduction speed of the sequence of images.

According to another aspect of the invention, there is provided a method of controlling a digital photographing apparatus, the method including setting a region in panoramic image, and displaying the panoramic image as a sequence of images representing the region.

The moving region may be from a first user-defined spot to a second user-defined spot in the panoramic image, or from a first image of the panoramic image to a third user-defined spot in the image.

Displaying the sequence of images may include pausing display of the sequence of image for a predetermined period of time, and displaying remaining images after the predetermined period of time elapses.

Displaying the sequence of images may include pausing display of the sequence of images for a predetermined period of time, and repeating displaying and pausing of remaining images by as much as the region after the predetermined period of time elapses.

The method may further include receiving a touch signal, and setting the region according to the touch signal.

The method may further include receiving a button input signal, and setting the region according to the button input signal.

The method may further include receiving an adjustment signal, and adjusting a display speed of the sequence of images according to the adjustment signal.

BRIEF DESCRIPTION OF THE DRAWINGS

The above and other features and advantages of the invention will become apparent in review of detail exemplary embodiments thereof with reference to the attached drawings, in which:

FIG. 12 is a flowchart of a method of controlling the digital photographing apparatus of FIG. 1, according to yet another embodiment of the invention.

DETAILED DESCRIPTION

Figure 1:
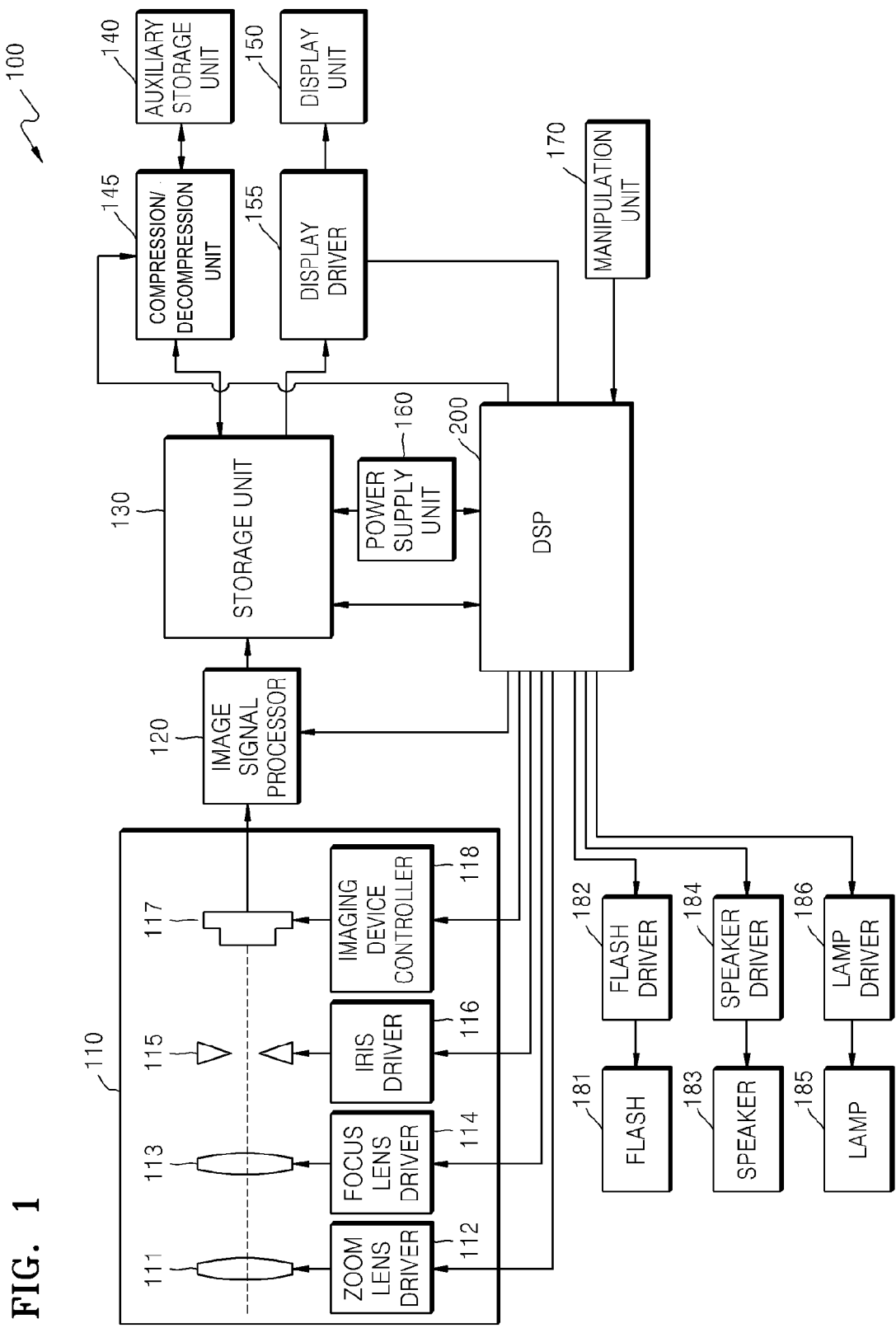
FIG. 1 is a block diagram of a digital photographing apparatus, according to an embodiment of the invention.

As the invention allows for various changes and numerous embodiments, particular embodiments are illustrated in the drawings and described in detail. However, these particular embodiments do not limit the invention to particular modes of practice, and it is to be appreciated that all changes, equivalents, and substitutes that do not depart from the spirit and technical scope of this disclosure are encompassed in the invention. In the description of the invention, certain detailed explanations may be omitted when it is deemed that they may unnecessarily obscure the essence of the invention.

The terms "first," "second," and the like, "primary," "secondary," and the like, as used herein do not denote any order, quantity, or importance, but rather are used to distinguish one element, region, component, layer, or section from another.

The terminology used herein is for the purpose of describing particular embodiments only and does not limit the invention. As used herein, the singular forms "a," "an" and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof.

The invention will now be described more fully with reference to the accompanying drawings, in which exemplary embodiments of the invention are shown. In the drawings, the same or corresponding elements are denoted by the same reference numerals and a repeated explanation thereof will not be given.

FIG. 1 is a block diagram of a digital photographing apparatus, according to an embodiment of the invention. A digital camera 100 will be explained as the digital photographing apparatus in the present embodiment. However, the digital photographing apparatus is not limited to being the digital camera 100 of FIG. 1, and various digital apparatus such as a digital single-lens reflex camera (DSLR), a hybrid camera, or the like may be the digital photographing apparatus. The configuration of the digital camera 100 will be described in detail according to an operation of the digital camera 100.

A process of photographing a subject will now be described. Light is transmitted from the subject through a zoom lens 111 and a focus lens 113, which are part of an optical system of an imaging unit 110. An amount of light is adjusted according to a degree of opening or closing of an iris 115, and the light forms an image of the subject on a receiving surface of an imaging device 117. The image formed on the receiving surface of the imaging device 117 is converted into an electrical image signal by photoelectric transformation.

The imaging device 117 may be a complementary metal-oxide semiconductor image sensor (CIS) or a charge-coupled device (CCD) that converts an optical signal into an electrical signal. The iris 115 may be opened during a normal state or when an auto focusing algorithm is executed according to a first release signal generated when a user presses a release button halfway, and may perform an exposure process after receiving a second release signal generated when the user completely presses the release button.

A zoom lens driver 112 and a focus lens driver 114 may control positions of the zoom lens 111 and the focus lens 113, respectively. Examples of controlling the positions are when a wide angle-zoom signal is generated so that a focal length of the zoom lens 111 is reduced and a viewing angle is increased, and when a telephoto-zoom signal is generated so that the focal length of the zoom lens 111 is increased and the viewing angle is reduced. Since after the position of the zoom lens 111 is set, the position of the focus lens 113 is adjusted, the viewing angle is substantially unaffected by the position of the focus lens 113. An iris driver 116 may control opening and closing of the iris 115. An imaging device controller 118 may control the sensitivity of the imaging device 117.

The zoom lens driver 112, the focus lens driver 114, the iris driver 116, and the imaging device controller 118 control the corresponding components according to calculation results of a digital signal processor (DSP) 200 based on exposure information, focal point information, or the like.

An image signal forming process will now be described. An image signal output from the imaging device 117 is output to an image signal processor 120. When the image signal input from the imaging device 117 to the image signal processor 120 is an analog signal, the image signal processor 120 converts the image signal into a digital image signal and performs various image processing processes on the image signal. The image signal is temporarily stored in a storage unit 130.

The image signal processor 120 may improve image quality by performing image signal processing processes such as auto white balance, auto exposure, gamma correction, and converting image data according to human sight to output an image signal having improved image quality. In addition, the image signal processor 120 may perform other image processing processes such as color filter array interpolation, color matrix, color correction, color enhancement, or the like.

The storage unit 130 may include a non-volatile program storage unit to store programs related to operations of the digital camera 100 regardless of the supply of power, and a volatile main storage unit to temporarily store image data and other data while power is supplied.

The program storage unit stores an operating program for operating the digital camera 100 and various application programs. The DSP 200 controls components according to programs stored in the program storage unit. In exemplary embodiments one or more programs are stored in the program storage unit so that the components may operate under control of the DSP 200 to, when a moving region is set in a panoramic image, display at least a portion of the panoramic image as a sequence of image corresponding to the user-defined moving region.

The main storage unit temporarily stores image signals that are output from the image signal processor 120, an auxiliary storage unit 140, or the like.

A power supply unit 160 may be connected directly to the main storage unit independent of the supply of power that operates the digital camera 100. Thus, a program that is stored in the program storage unit to rapidly boot the digital camera 100 may be copied to the main storage unit and executed. In addition, when the digital camera 100 is booted again, data stored in the main storage unit may be rapidly read.

Image signals stored in the main storage unit may be output via a display driver 155, which converts the image signals into image signals suitable for display and output. Converted image signal may be displayed for a user on a display unit 150. The display unit 150 may serve as a viewfinder for consecutively displaying the image signals obtained by the imaging device 117 during a photographing mode to determine a photographing range. Various display apparatuses such as a liquid display device (LCD), an electrophoretic display device (EDD), or the like may be used as the display unit 150. Furthermore, the display unit 150 may include a touch screen so that user manipulation signals may be input via the touch screen and a manipulation unit 170.

A process of recording the image signal generated as described above will now be described. An image signal is temporarily stored in the storage unit 130. In this case, the image signal and various pieces of information related to the image signal are stored in the auxiliary storage unit 140. In addition, the image signal and the pieces of information are output to a compression/decompression unit 145. In the compression/decompression unit 145, a compression circuit applies a compression process such as JPEG compression to an image to form an image file requiring less storage memory than the original image signal. The compressed image file is stored in the auxiliary storage unit 140.

The auxiliary storage unit 140 may be a fixed-type semiconductor memory such as an external flash memory, a semiconductor memory such as a card-type flash memory that is detachable or removable from a device and has a card or stick shape, a magnetic recording medium such as a hard disc or a floppy disc, an optical recording medium, or the like.

A process of reproducing an image will now be described. The image file that is compressed and stored in the auxiliary storage unit 140 is output to the compression/decompression unit 145. A decompression process, that is, a decoding process is performed on the image file to extract an image signal from the image file. The decompressed image signal is output to the storage unit 130. The image signal may be temporarily stored in the storage unit 130, and may be reproduced on the display unit 150 through the display driver 155.

The digital camera 100 includes the manipulation unit 170 for receiving external user signals as an inputs. Examples of the manipulation unit 170 may include various functional buttons such as a shutter release button for opening and closing a shutter (not shown) to expose the imaging device 117 to light for a predetermined period of time, a power button that may be pressed to activate the power supply 160, a wide angle-zoom button and a telephoto-zoom button for increasing or reducing a viewing angle according to an input, a direction key for selecting character input, a photographing mode button, a reproduction mode button, a white balance setting button, and an exposure setting button.

The digital camera 100 may include a flash 181, and a flash driver 182 that drives the flash 181. The flash 181 is a light-emitting device that illuminates a subject when photographing is performed in a dark environment.

A speaker 183 and a lamp 185 may respectively output a sound signal and a light signal to indicate an operating state or the like of the digital camera 100. In particular, according to the present embodiment, if a photographing condition including a point of time for setting photographing variables and a point of time for photographing is changed in a manual mode, an alarm signal indicating this change may be provided as a sound or a light signal output through the speaker 183 or the lamp 185, respectively. A speaker driver 184 may control the type or volume of the sound, or the like of the speaker 183. A lamp driver 186 may control the lamp 185 to emit or not to emit light, a light-emitting period of the lamp 185, a type of light emission of the lamp 185, or the like.

The DSP 200 may perform calculation processes according to an operating system and an application system that are stored as programs in the storage unit 130, may temporarily store calculation results, and may control corresponding components according to the calculation results so as to operate the digital camera 100 as described above. In particular, according to the present embodiment, when a moving region is set in a panoramic image, the DSP 200 displays a sequence of images by according to the user-defined moving region.

Hereinafter, the DSP 200 will be described in detail with reference to FIG. 2 through FIG. 12.

Figure 2:
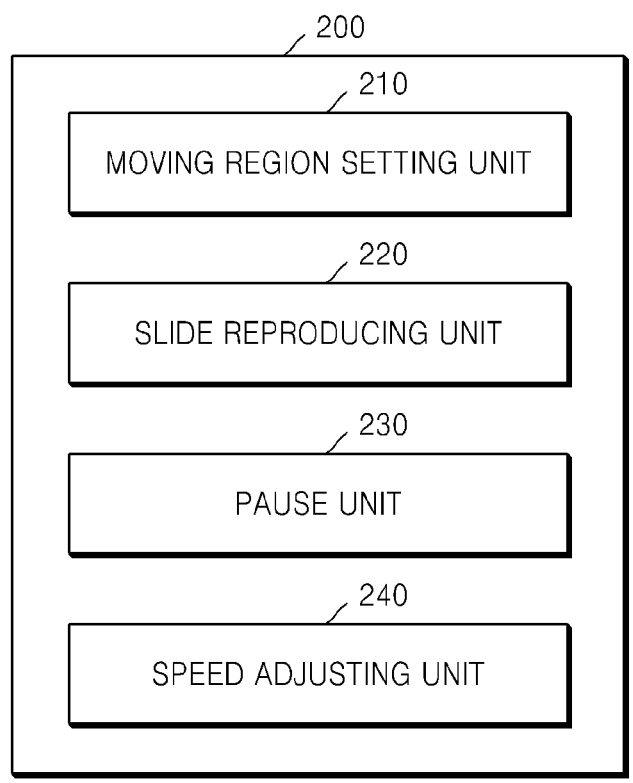
FIG. 2 is a detailed block diagram of the digital signal processor of FIG. 1, according to an embodiment of the invention.

FIG. 2 is a detailed block diagram of the DSP 200 of FIG. 1, according to an embodiment of the invention. The DSP 200 includes a moving region setting unit 210, a slide reproducing unit 220, a pause unit 230, and a speed adjusting unit 240.

Figure 3A:
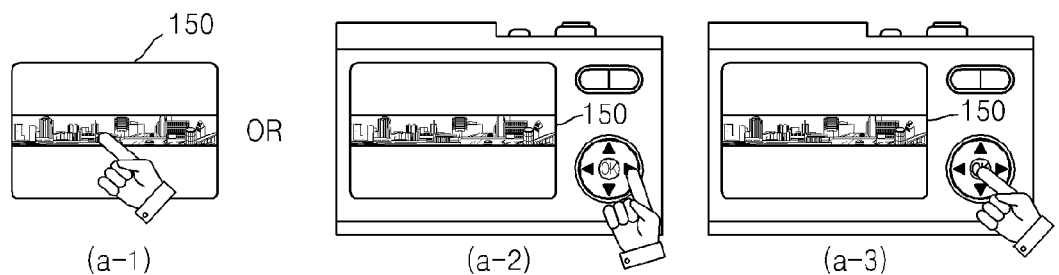
FIGS. 3A through 3E show a case where image slides are reproduced in a moving region, according to an embodiment of the invention.
Figure 3B:
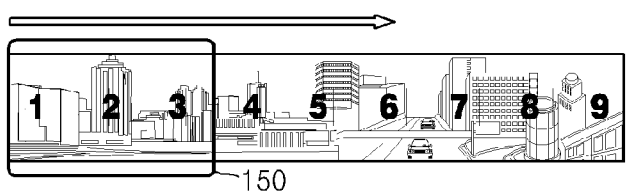
Figure 3C:
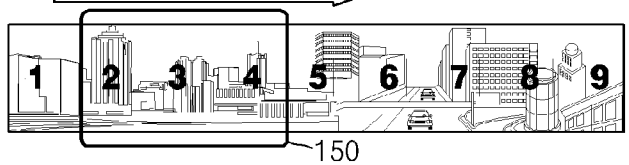
Figure 3D:
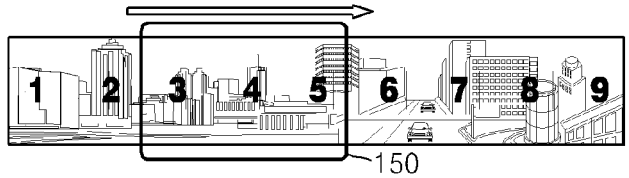
Figure 3E:
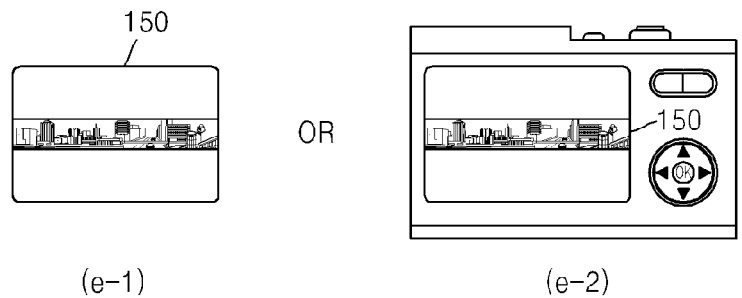

Referring to FIG. 2, the moving region setting unit 210 sets a desired region of a user in a panoramic image. When an image with a horizontally long length (hereinafter, referred to as a horizontal panoramic image) or an image with a vertically long length (hereinafter, referred to as a vertical panoramic image) is displayed on the display unit 150 with a predetermined ratio (e.g., in its entirety), it may be difficult to identify the image, as shown in FIG. 3A. In this case, the user may set a desired moving region in the displayed panoramic image.

A user may set a moving region by selecting a spot in a panoramic image. In this case, a sequence of slide images from a first image or the panoramic image to the user-defined spot is reproduced. Additionally or alternatively, a region from a first user-defined spot to a second user-defined spot may be set in the panoramic image. In this case, a sequence of slides images in representing set region is reproduced.

Figure 4A:
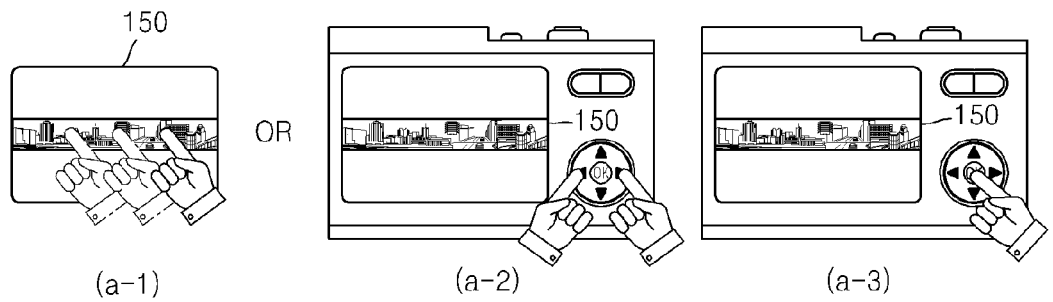
FIGS. 4A through 4E show a case where image slides are reproduced in a moving region, according to another embodiment of the invention.
Figure 4B:
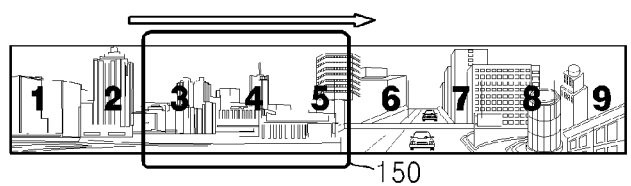
Figure 4C:
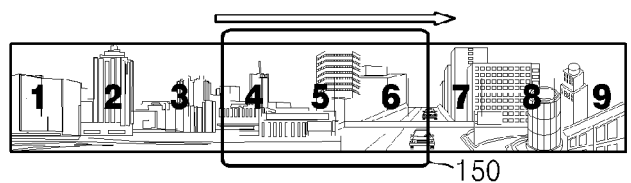
Figure 4D:
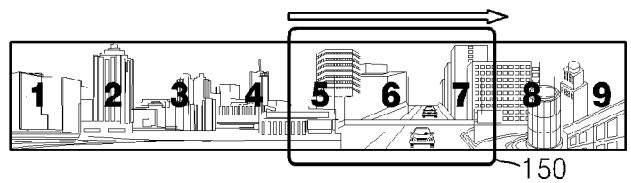
Figure 4E:
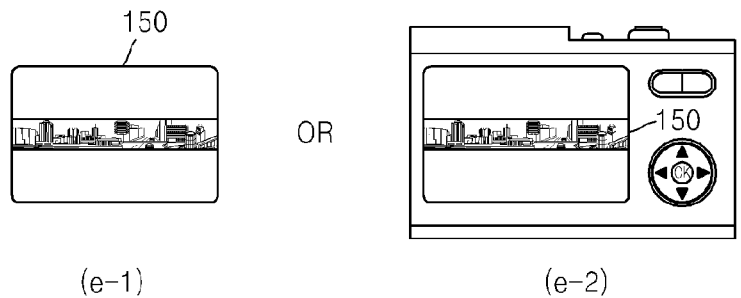

When the display unit 150 includes a touch screen, a user may set a spot by touching the display unit 150, and a region from a first spot to a second spot may be set in an image by dragging a finger across the image on the display unit 150. (a-1) of FIG. 3A shows a case where a spot is set by touching a horizontal panoramic image. (a-1) of FIG. 4A shows a case where a region from a first user-defined spot to a second user-defined spot is set as a moving region by dragging a finger across a horizontal panoramic image. A touch signal of the display unit 150 may be received to extract corresponding coordinates, thereby obtaining a touched position or region.

When the display unit 150 is other than a touch screen, a region from a first spot to a second spot in an image may be set, and a spot in the image may be set by pressing one or more buttons (hereinafter, referred to as any one of a right, a left, an up, a down, and an OK button, for convenience of description) included in the manipulation unit 170. (a-2) of FIG. 3A shows a case where a spot is moved in a horizontal panoramic image by pressing the right button. In this case, an active window or a pointer is displayed on the display unit 150 to provide visual feedback as the user adjusts the spot. (a-3) of FIG. 3A shows a case where a spot to be moved is set by pressing the OK button. (a-2) of FIG. 4A shows a case where a region to be moved is set or finalized in a horizontal panoramic image by pressing the right and left buttons. In this case, an active window or a pointer is displayed on the display unit 150 to provide visual feedback as the user adjusts the moving region. (a-3) of FIG. 4A shows a case where a region to be moved is set or finalized by pressing the OK button. A signal of a position of the active window or the pointer may be received by the moving region setting unit 210 to extract corresponding coordinates, thereby obtaining the set position or region.

The slide reproducing unit 220 reproduces slide images (i.e., a sequence of images) representing the moving region that is set by the moving region setting unit 210. For convenience of description, a case related to a horizontal panoramic image has been described. However, the above-described methods may also apply to a vertical panoramic image. According to the present embodiment, a method of reproducing image slides is performed by the slide reproducing unit 220 together with the pause unit 230. The method includes the six following examples.

First, the slide reproducing unit 220 reproduces image slides that represent at least a portion of the panoramic image between a first image to a set spot. FIG. 3A shows a spot set when a user touches a horizontal panoramic image, or a spot to be moved is set by pressing the left button and the OK button. In this case, the slide reproducing unit 220 reproduces (i.e., presents) image slides encompassing the first image to the user-defined spot, as depicted by the moving box 150 shown in FIGS. 3B through 3D. When the image slides have been presented, the entire panoramic image is displayed again, as shown in (e-1) or (e-2) of FIG. 3E. At any time, a user may stop an operation by performing a predetermined manipulation during the reproduction of the image slides.

Second, the slide reproducing unit 220 reproduces image slides that represent at least a portion of the panoramic image between a first set spot and a second set spot. FIG. 4A shows a case where a moving region is set in a horizontal panoramic image by dragging a finger across the horizontal panoramic image from a first spot to a second spot, or the moving region is set from a first spot to a second spot in an image by pressing the right and left buttons, and the OK button. In this case, the slide reproducing unit 220 reproduces (i.e., presents) image slides encompassing the first user-defined spot to the second user-defined spot, as depicted by the moving box 150 in FIGS. 4B through 4D. When the image slides have been presented, the entire panoramic image is displayed again, as shown in (e-1) or (e-2) of FIG. 4E. At any time, a user may stop an operation by performing a predetermined manipulation during the reproduction of the image slides.

Figure 5A:
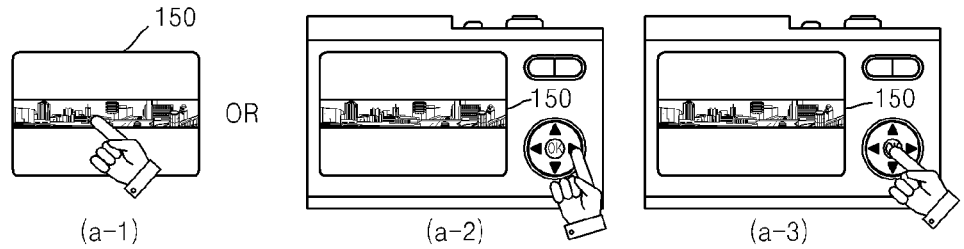
FIGS. 5A through 5H show a case where image slides are reproduced in a moving region, according to another embodiment of the invention.
Figure 5B:
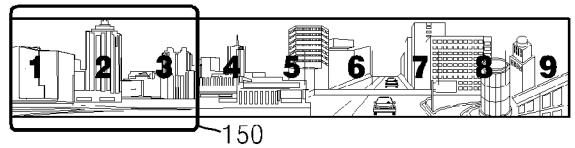
Figure 5C:
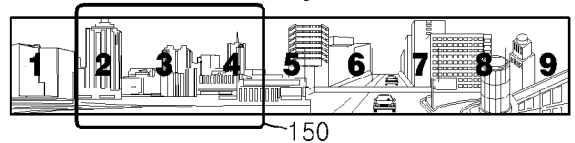
Figure 5D:
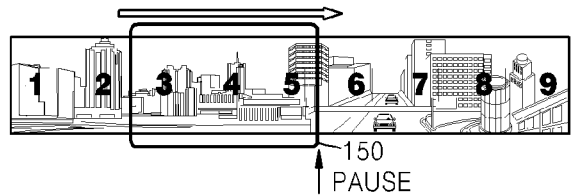
Figure 5E:
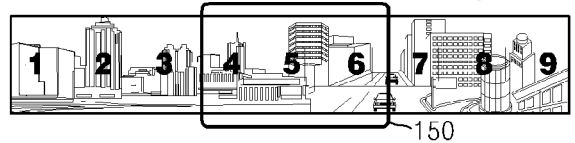
Figure 5F:
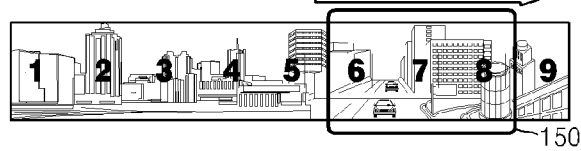
Figure 5G:
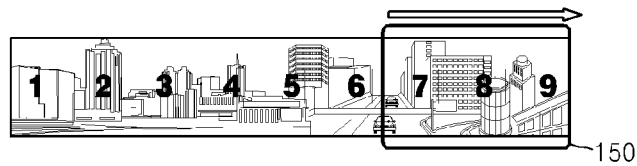
Figure 5H:
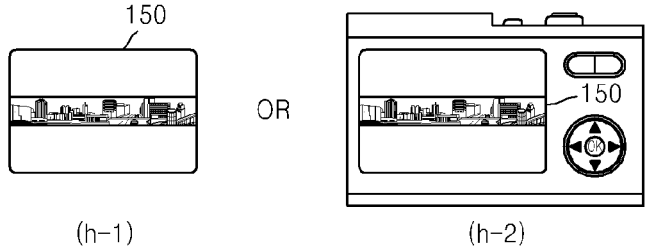

Third, the slide reproducing unit 220 reproduces image slides that represent at least a portion of the panoramic image between a first image and a user-defined spot. Then, the pause unit 230 pauses a slide reproducing operation for a predetermined period of time. After the predetermined period of time elapses, the slide reproducing unit 220 reproduces the remaining image slides. FIG. 5A shows a case where a spot is set in a horizontal panoramic image by touching the horizontal panoramic image, or a region to be moved is set by pressing the right button and the OK button. In this case, the slide reproducing unit 220 reproduces (i.e., presents) image slides encompassing the first image to the user-defined spot, as depicted by the moving box 150 in FIGS. 5B through 5D. Then, the pause unit 230 pauses the reproduction of the image slides for a predetermined period of time. After the predetermined period of time elapses, the slide reproducing unit 220 reproduces the remaining image slides, as shown in FIGS. 5D and 5E. When the image slides have been presented, the entire panoramic image is displayed again, as shown in (h-1) or (h-2) of FIG. 5H. At any time, a user may stop an operation by performing a predetermined manipulation during the reproduction of the image slides.

Figure 6A:
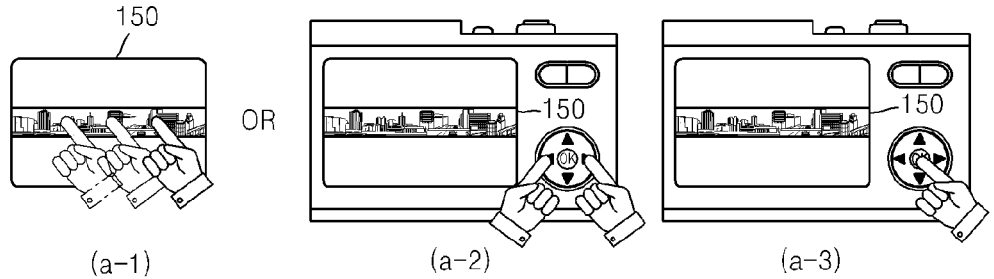
FIGS. 6A through 6H show a case where image slides are reproduced in a moving region, according to another embodiment of the invention.
Figure 6B:
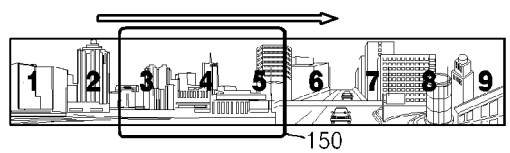
Figure 6C:
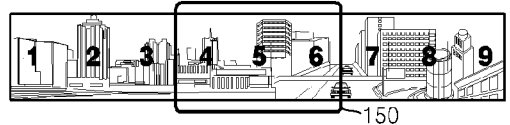
Figure 6D:
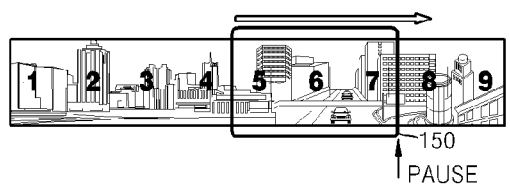
Figure 6E:
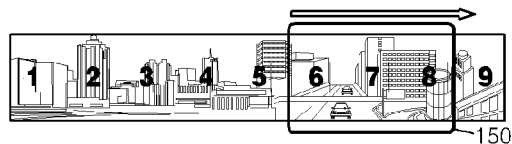
Figure 6F:
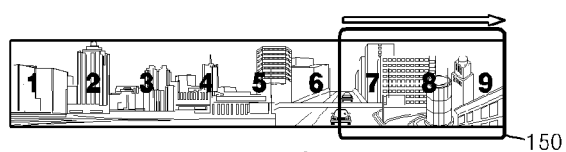
Figure 6G:
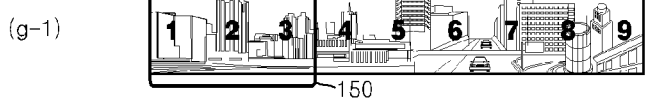
Figure 6G:
Figure 6H:
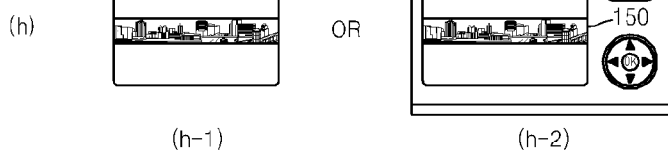

Fourth, the slide reproducing unit 220 reproduces image slides that represent at least a portion of the panoramic image between a first spot and a second spot. Then, the pause unit 230 pauses a slide reproducing operation for a predetermined period of time. After the predetermined period of time elapses, the slide reproducing unit 220 reproduces the remaining image slides. FIG. 6A shows a case where a moving region is set in a horizontal panoramic image by dragging a finger across the horizontal panoramic image from a first spot to a second spot, or the moving region is set from a first user-defined spot to a second user-defined spot in an image by pressing the right and left buttons, and the OK button. In this case, the slide reproducing unit 220 reproduces image slides encompassing the first user-defined spot to the second user-defined spot, as depicted by the moving box 150 in FIGS. 6B through 6D. Then, the pause unit 230 pauses the reproduction of the image slides for a predetermined period of time. After the predetermined period of time elapses, the slide reproducing unit 220 continues reproducing the remaining image slides, as shown in FIGS. 6D and 6F. The entire panoramic image is displayed again, as shown in (h-1) or (h-2) of FIG. 6H, when all slide image have been presented. Furthermore, the slide reproducing unit 220 may reproduce additional images, as shown in FIGS. 6B to 6G (g-2), as image slides, and then display the entire panoramic image again. At any time, a user may stop an operation by performing a predetermined manipulation during the reproduction of the image slides.

Figure 7A:
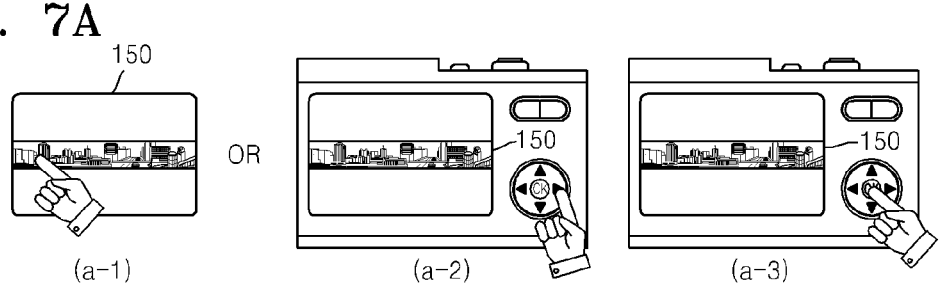
FIGS. 7A through 7H show a case where image slides are reproduced in a moving region, according to another embodiment of the invention.
Figure 7B:
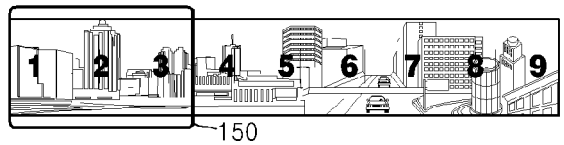
Figure 7C:
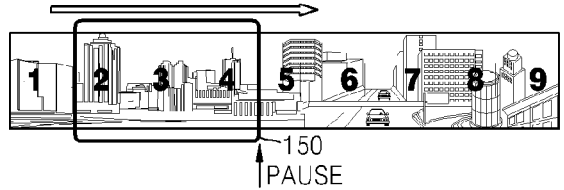
Figure 7D:
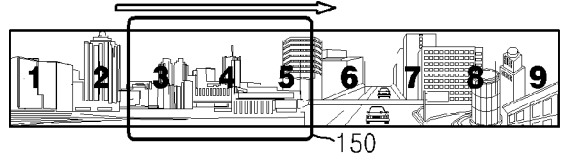
Figure 7E:
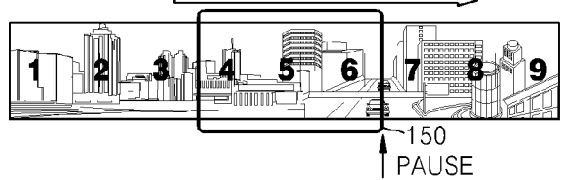
Figure 7F:
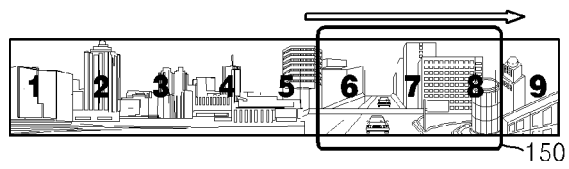
Figure 7G:
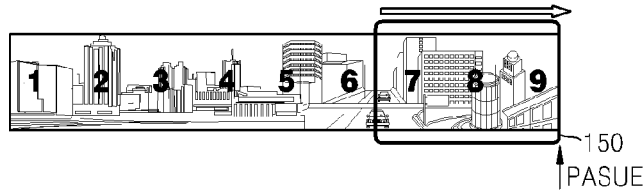
Figure 7H:
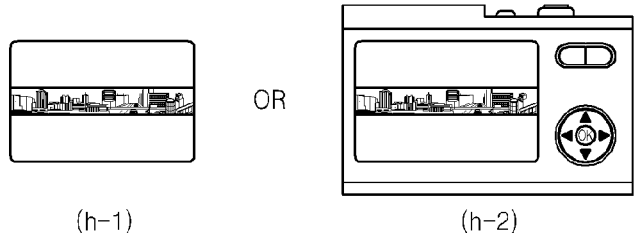

Fifth, the slide reproducing unit 220 reproduces image slides that represent at least a portion of the panoramic image from a first image to a set spot. Then, the pause unit 230 pauses a slide reproducing operation for a predetermined period of time. After the predetermined period of time elapses, the slide reproducing unit 220 and the pause unit 230 repeat the image slide reproduction and pause of the remaining image slides in increments of slide images. FIG. 7A shows a case where a user-defined spot is set in a horizontal panoramic image by touching the horizontal panoramic image, or a region to be moved is set by pressing the right button and the OK button. In this case, the slide reproducing unit 220 reproduces image slides encompassing the first image to the user-defined spot. Then, the pause unit 230 pauses the reproduction of the image slides for a predetermined period of time. After the predetermined period of time elapses, the slide reproducing unit 220 continues reproducing the image slides, and the pause unit 230 pauses the reproduction of the image slides for a predetermined period of time, as shown in FIGS. 7D and 7E. After the predetermined period of time elapses, the slide reproducing unit 220 continues reproducing the image slides and the pause unit 230 pauses the reproduction of the image slides for a predetermined period of time, as shown in FIGS. 7F and 7G. When all of the image slides have been reproduced, the entire panoramic image is displayed again, as shown in (h-1) or (h-2) of FIG. 7H. At any time, a user may stop an operation by performing a predetermined manipulation during the reproduction of the image slides.

Figure 8A:
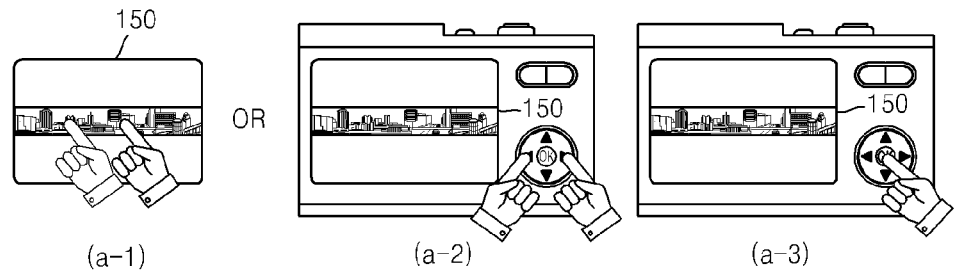
FIGS. 8A through 8H show a case where image slides are reproduced in a moving region, according to another embodiment of the invention.
Figure 8B:
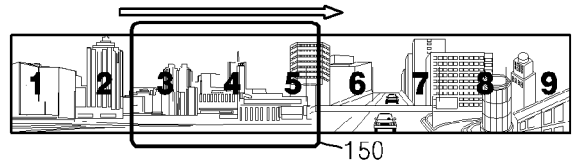
Figure 8C:
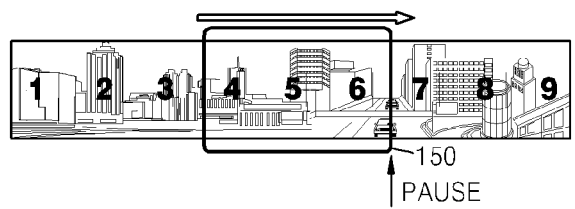
Figure 8D:
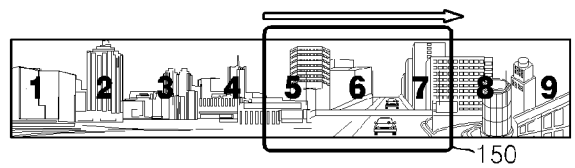
Figure 8E:
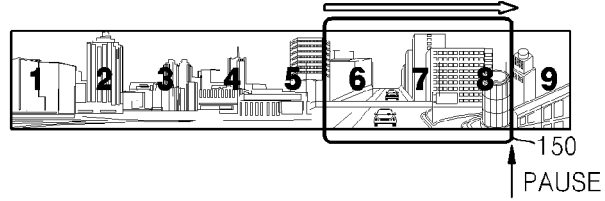
Figure 8F:
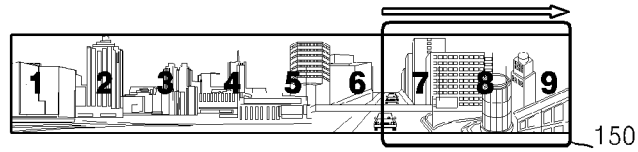
Figure 8G:
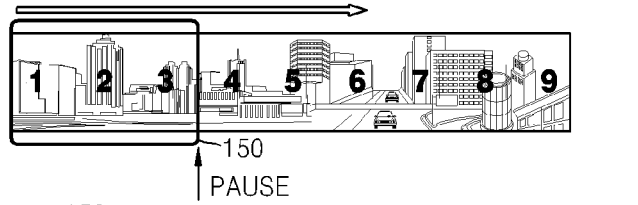
Figure 8H:
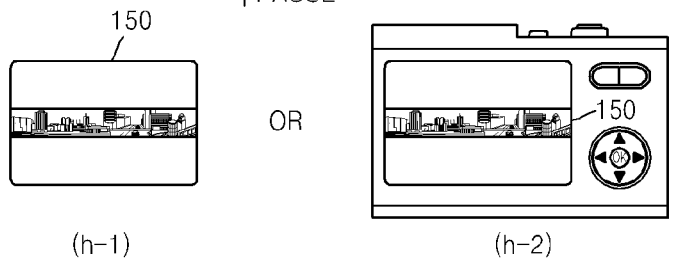

Sixth, the slide reproducing unit 220 reproduces image slides that represent at least a portion of the panoramic image from a first spot to a second spot. Then, the pause unit 230 pauses a slide reproducing operation for a predetermined period of time. After the predetermined period of time elapses, the slide reproducing unit 220 and the pause unit 230 repeat the reproduction and pause of the remaining image slides in increments of slide images. FIG. 8A shows a case where a moving region is set in a horizontal panoramic image by dragging a finger across the horizontal panoramic image from a first spot to a second spot, or a moving region is set in an image by pressing the right and left buttons, and the OK button. In this case, the slide reproducing unit 220 reproduces image slides encompassing the first user-defined spot to the second user-defined spot. Then, the pause unit 230 pauses the reproduction of the image slides for a predetermined period of time. After the predetermined period of time elapses, the slide reproducing unit 220 continues reproducing the image slides, and the pause unit 230 pauses the reproduction of the image slides for a predetermined period of time, as shown in FIGS. 8D and 8E. After the predetermined period of time elapses, the slide reproducing unit 220 continues reproducing image slides until a last image of the horizontal panoramic image has been presented, as shown in FIG. 8F, and the entire panoramic image is displayed, as shown in (h-1) or (h-2) of FIG. 8H. Furthermore, the slide reproducing unit 220 may reproduce images from FIGS. 8B to 8G as image slides and then may display the entire panoramic image again. At any time, a user may stop an operation by performing a predetermined manipulation during the reproduction of the image slides.

In the first through sixth examples, the speed adjusting unit 240 may adjust a reproducing speed of image slides during the reproduction of image slides.

Figure 9A:
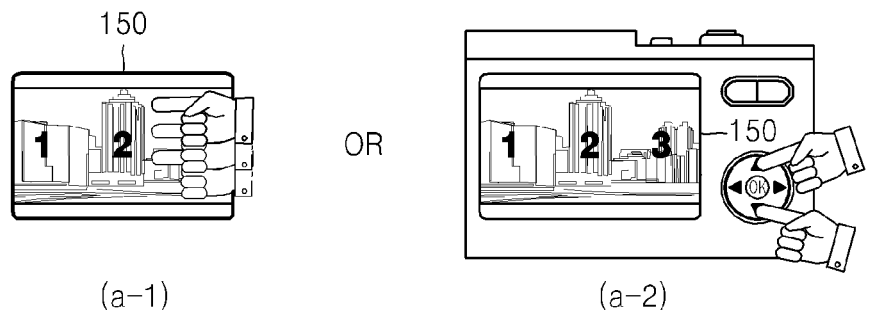
FIGS. 9A through 9D show a case where a slide reproduction speed is adjusted by user's setting, according to an embodiment of the invention.
Figure 9B:
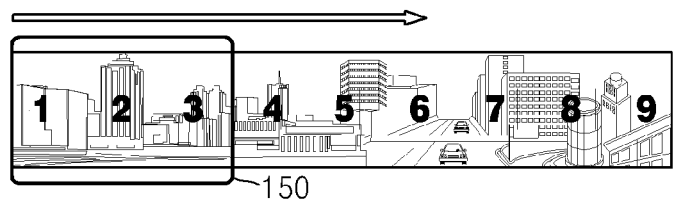
Figure 9C:
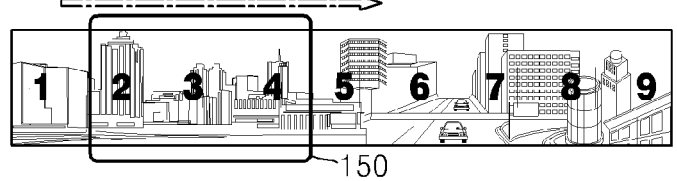
Figure 9D:
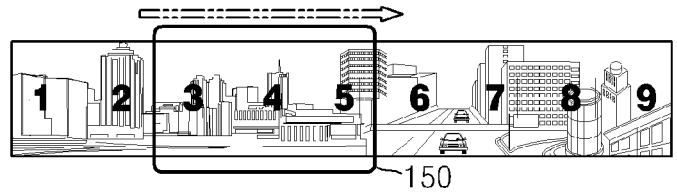

(a-1) of FIG. 9A shows a case where a slide reproduction speed is adjusted by touching upper/lower portions of image slides during reproduction of image slides when the display unit 150 includes a touch screen. (a-2) of FIG. 9B shows a case where a slide reproduction speed is adjusted by sequentially pressing the up and down buttons during reproduction of image slides when the display unit 150 is not a touch screen. FIGS. 9A through 9D are related to a horizontal panoramic image. With regard to a vertical panoramic image, a slide reproduction speed may be adjusted by right/left manipulations (touch or press of button). FIGS. 9B through 9D shows a case where a slide reproduction speed is gradually increased by a speed adjusting operation.

Since a panoramic image may be displayed as a series of image slides, the panoramic image may be more easily identified. In addition, by adjusting a slide reproduction speed, the image slides may be displayed to a desired spot and at a desired speed.

A method of controlling a digital photographing apparatus will now be described with reference to FIGS. 10 through 12.

A first example of the method of controlling a digital photographing apparatus will now be described with reference to FIG. 10.

Figure 10:
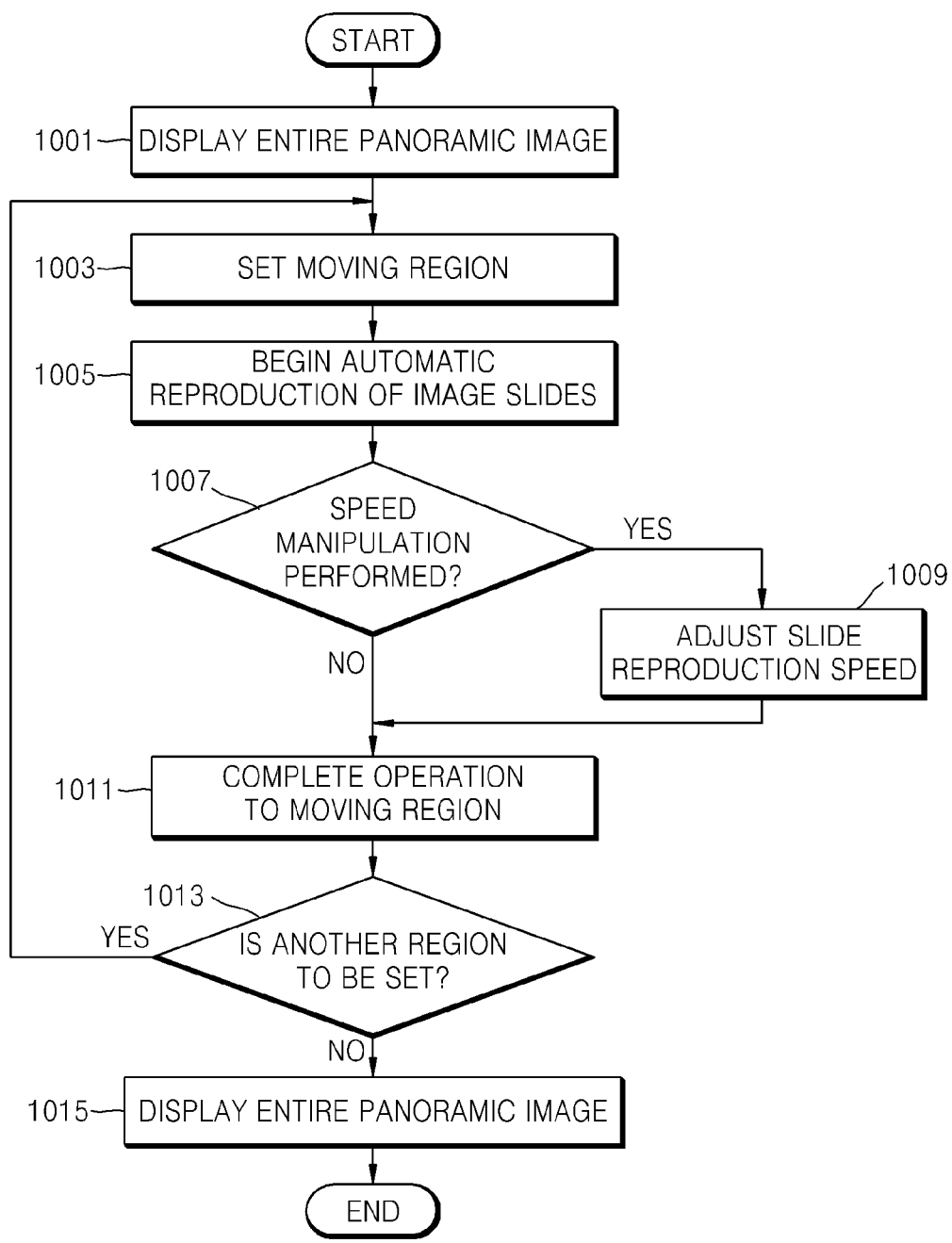
FIG. 10 is a flowchart of a method of controlling the digital photographing apparatus of FIG. 1, according to an embodiment of the invention.

Referring to FIG. 10, the DSP 200 may display an entire panoramic image (operation 1001). The panoramic image may be a horizontal panoramic image as shown in (a-1) of FIG. 3A. Although not illustrated, the panoramic image may be a vertical panoramic image.

Then, the DSP 200 receives a moving region setting signal that is input by a user (operation 1003). A method of setting a moving region is classified into two methods. First, a spot may be set in a panoramic image. In this case, image slides are reproduced from a first image of the panoramic image to the user-defined spot. Second, a region from a first spot to a second spot may be set in a panoramic image. In this case, image slides encompassing the set region are reproduced. When the display unit 150 includes a touch screen, a user-defined spot may be set by touching the display unit 150, and a region from a first spot to a second spot may be set by dragging a finger across an image on the display unit 150. When the display unit 150 does not include a touch screen, a region from a first spot to a second spot may be set, and a user-defined spot may be set by pressing the right, left, up, down, and OK buttons included in the manipulation unit 170.

When the moving region has been set (operation 1003), the DSP 200 begins automatic reproduction of image slides from a first image to a user-defined spot, or from a first user-defined spot to a second user-defined spot according to the set region (operation 1005).

During the reproduction of the image slides, the DSP 200 determines whether a speed adjustment signal (e.g., an up/down manipulation) is received (operation 1007). When a speed adjustment signal is received, a slide reproduction speed is adjusted (operation 1009). With regard to a horizontal panoramic image, the slide reproduction speed may be adjusted using up/down manipulations. With regard to a vertical panoramic image, the slide reproduction speed may be adjusted using right/left manipulations. However, the present embodiment is not limited to these examples. When the display unit 150 includes a touch screen, the slide reproduction speed of the horizontal panoramic image may be adjusted using an up/down drag touch, and the slide reproduction speed of the vertical panoramic image may be adjusted using a right/left drag touch. However, the present embodiment is not limited to these examples. When the display unit 150 does not include a touch screen, the slide reproduction speed of the horizontal panoramic image may be adjusted using an up/down buttons, and the slide reproduction speed of the vertical panoramic image may be adjusted using a right/left buttons. However, the present embodiment is not limited to these examples.

When the image slides have all been reproduced for the user-defined moving region at a corresponding speed (operation 1011), the DSP 200 determines whether another moving region is to be set according to a user input (operation 1013). When another moving region is to be set, the method proceeds to operation 1003. If not, the entire panoramic image is displayed again (operation 1015).

A second example of the method of controlling a digital photographing apparatus will now be described with reference to FIG. 11.

Figure 11:
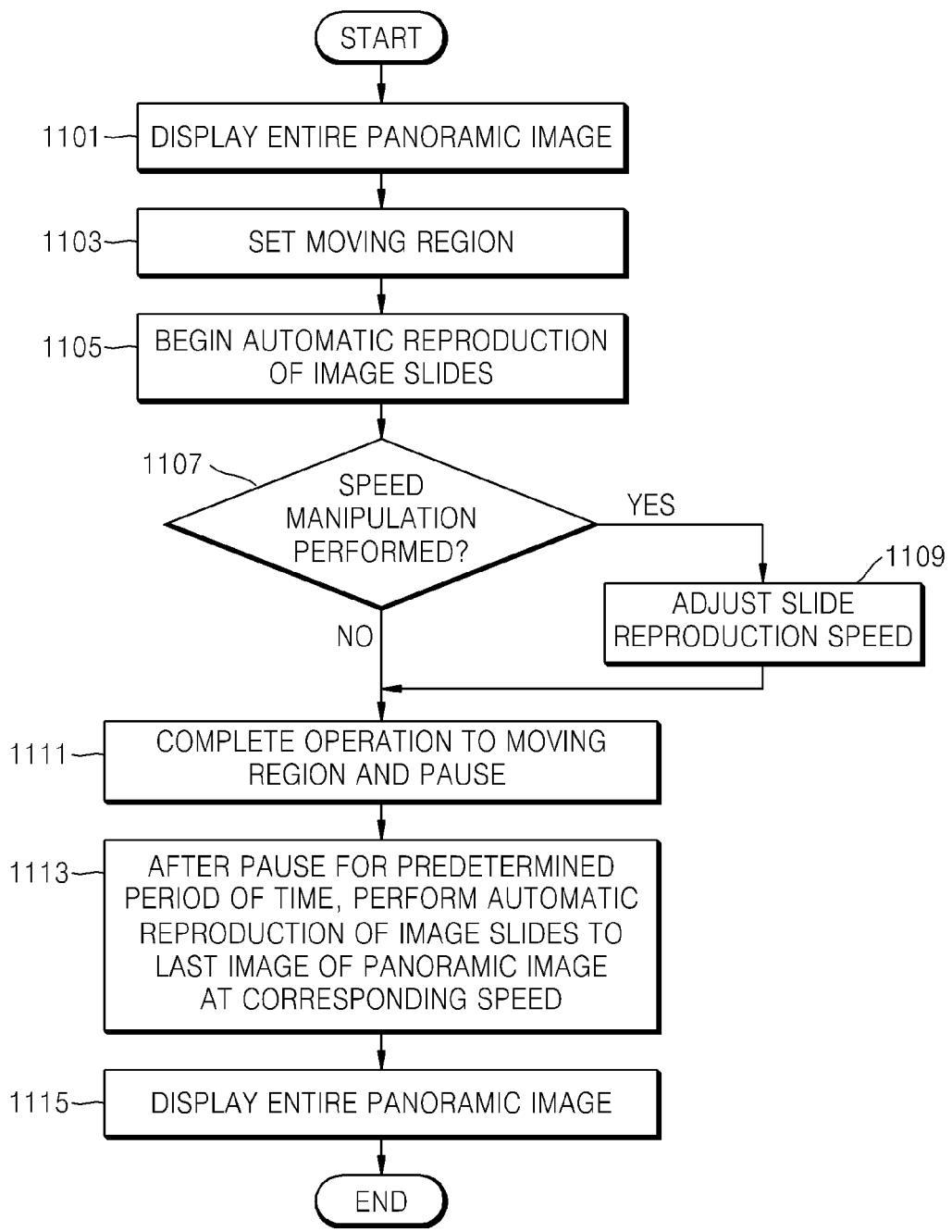
FIG. 11 is a flowchart of a method of controlling the digital photographing apparatus of FIG. 1, according to another embodiment of the invention.

Referring to FIG. 11, the DSP 200 may display an entire panoramic image (operation 1101). The panoramic image may be a horizontal panoramic image as shown in (a-1) of FIG. 3A. Although not illustrated, the panoramic image may be a vertical panoramic image.

Then, the DSP 200 receives a moving region setting signal that is input by a user (operation 1103). A method of setting a moving region is classified into two methods. First, a spot may be set in a panoramic image. In this case, image slides are reproduced from a first image to the user-defined spot. Second, a region from a first spot to a second spot may be set in a panoramic image. In this case, image slides in the set region are reproduced. When the display unit 150 includes a touch screen, a spot may be set, and a region from a first user-defined spot to a second user-defined spot may be set by dragging a finger across an image on the display unit 150. When the display unit 150 does not include a touch screen, a region from a first spot to a second spot may be set, and a spot may be set by pressing the right, left, up, down, and OK buttons included in the manipulation unit 170.

When the moving region has been set (operation 1103), the DSP 200 begins automatic reproduction of image slides from a first image to a user-defined spot, or from a first user-defined spot to a second user-defined spot according to the set region (operation 1105).

During the reproduction of the image slides, the DSP 200 determines whether a speed adjustment signal (e.g., an up/down manipulation) is received (operation 1107). When a speed adjustment signal is received, a slide reproduction speed is adjusted (operation 1109). With regard to a horizontal panoramic image, the slide reproduction speed may be adjusted using up/down manipulations. With regard to a vertical panoramic image, the slide reproduction speed may be adjusted using right/left manipulations. However, the present embodiment is not limited to these examples. When the display unit 150 includes a touch screen, the slide reproduction speed of the horizontal panoramic image may be adjusted using an up/down drag touch, and the slide reproduction speed of the vertical panoramic image may be adjusted using a right/left drag touch. However, the present embodiment is not limited to these examples. When the display unit 150 does not include a touch screen, the slide reproduction speed of the horizontal panoramic image may be adjusted using up/down buttons, and the slide reproduction speed of the vertical panoramic image may be adjusted using right/left buttons. However, the present embodiment is not limited to these examples.

When all of the image slides for the set moving region have been reproduced at a corresponding speed, the DSP 200 pauses a slide reproducing operation for a predetermined period of time (operation 1111).

Then, after the predetermined period of time elapses, the DSP 200 continues reproducing image slides from the set moving region to a last image of the panoramic image (i.e., images of panoramic image following the user-defined moving region) (operation 1113).

When all image slides have been reproduced, the DSP 200 displays the entire panoramic image again (operation 1115).

According to another embodiment of the invention, the DSP 200 may reproduce image slides preceding the set region, may pause the slide reproducing operation for a predetermined period of time, and may display the entire panoramic image again after the predetermined period of time elapses. Furthermore, the DSP 200 may display the entire panoramic image in which image slides are reproduced from an image in which a region is set to an image in which a region is not set.

A third example of the method of controlling a digital photographing apparatus will now be described with reference to FIG. 12.

Referring to FIG. 12, the DSP 200 may display an entire panoramic image (operation 1201). The panoramic image may be a horizontal panoramic image as shown in (a-1) of FIG. 3A. Although not illustrated, the panoramic image may be a vertical panoramic image.

Then, the DSP 200 receives a moving region setting signal that is input by a user (operation 1203). A method of setting a moving region is classified into two methods. First, a spot may be set in a panoramic image. In this case, image slides are reproduced from a first image to the user-defined spot. Second, a region from a first spot to a second spot may be set in a panoramic image. In this case, image slides in the set region are reproduced. When the display unit 150 includes a touch screen, a user-defined spot may be set by touching the display unit 150, and a region from a first spot to a second spot may be set by dragging a finger across an image on the display unit 150. When the display unit 150 does not include a touch screen, a region from a first spot to a second spot may be set, and a spot may be set by pressing the right, left, up, down, and OK buttons included in the manipulation unit 170.

When the moving region has been set (operation 1203), the DSP 200 begins automatic reproduction of image slides from a first image to a user-defined spot, or from a first user-defined spot to a second set spot according to the set region (operation 1205).

During the reproduction of the image slides, the DSP 200 determines whether a speed change signal (e.g., an up/down manipulation) is received (operation 1207). When a speed change signal is received, a slide reproduction speed is adjusted (operation 1209). With regard to a horizontal panoramic image, the slide reproduction speed may be adjusted using up/down manipulations. With regard to a vertical panoramic image, the slide reproduction speed may be adjusted using right/left manipulations. However, the present embodiment is not limited to these examples. When the display unit 150 includes a touch screen, the slide reproduction speed of the horizontal panoramic image may be adjusted using an upper/lower drag touch, and the slide reproduction speed of the vertical panoramic image may be adjusted using a right/left drag touch. However, the present embodiment is not limited to these examples. When the display unit 150 does not include a touch screen, the slide reproduction speed of the horizontal panoramic image may be adjusted using up/down buttons, and the slide reproduction speed of the vertical panoramic image may be adjusted using right/left buttons. However, the present embodiment is not limited to these examples.

When all image slides for the user-defined moving region have been reproduced at a corresponding speed, the DSP 200 pauses a slide reproducing operation for a predetermined period of time (operation 1211).

Then, after the predetermined period of time elapses, the DSP 200 repeats the reproduction and pause of the remaining image slides by as much as the set moving region (operation 1213).

The DSP 200 determines whether the reproduction and pause of image slides is repeated to a last image of the panoramic image by as much as the set moving region (operation 1215), and displays the entire panoramic image again (operation 1217).

According to another embodiment of the invention, the DSP 200 may repeat the reproduction and pause of image slides from an image in which a region is set to an image in which a region is not set, and then may display the entire panoramic image again.

The embodiments disclosed herein may include a memory for storing program data, a processor for executing the program data to implement the methods and apparatus disclosed herein, a permanent storage such as a disk drive, a communication port for handling communication with other devices, and user interface devices such as a display, a keyboard, a mouse, etc. When software modules are involved, these software modules may be stored as program instructions or computer-readable codes, which are executable by the processor, on a non-transitory or tangible computer-readable media such as a read-only memory (ROM), a random-access memory (RAM), a compact disc (CD), a digital versatile disc (DVD), a magnetic tape, a floppy disk, an optical data storage device, an electronic storage media (e.g., an integrated circuit (IC), an electronically erasable programmable read-only memory (EEPROM), a flash memory, etc.), a quantum storage device, a cache, and/or any other storage media in which information may be stored for any duration (e.g., for extended time periods, permanently, for brief instances, for temporary buffering, for caching, etc.). As used herein, a computer-readable storage medium expressly excludes any computer-readable media on which signals may be propagated. However, a computer-readable storage medium may include internal signal traces and/or internal signal paths carrying electrical signals thereon.

Any references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of this disclosure, reference has been made to the embodiments illustrated in the drawings, and specific language has been used to describe these embodiments. However, no limitation of the scope of this disclosure is intended by this specific language, and this disclosure should be construed to encompass all embodiments that would normally occur to one of ordinary skill in the art in view of this disclosure.

Disclosed embodiments may be described in terms of functional block components and various processing steps. Such functional blocks may be realized by any number of hardware and/or software components configured to perform the specified functions. For example, the embodiments may employ various integrated circuit components (e.g., memory elements, processing elements, logic elements, look-up tables, and the like) that may carry out a variety of functions under the control of one or more processors or other control devices. Similarly, where the elements of the embodiments are implemented using software programming or software elements, the embodiments may be implemented with any programming or scripting language such as C, C++, Java, assembler, or the like, using any combination of data structures, objects, processes, routines, and other programming elements. Functional aspects may be implemented as instructions executed by one or more processors. Furthermore, the embodiments could employ any number of conventional techniques for electronics configuration, signal processing, control, data processing, and the like. The words "mechanism" and "element" are used broadly and are not limited to mechanical or physical embodiments, but can include software routines in conjunction with processors, etc.

The particular implementations shown and described herein are illustrative examples and are not intended to otherwise limit the scope of this disclosure in any way. For the sake of brevity, conventional electronics, control systems, software development, and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the embodiments unless the element is specifically described as "essential" or "critical".

The use of the terms "a," "an," "the," and similar referents in the context of describing the embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. The steps of all methods described herein can be performed in any suitable order unless otherwise indicated herein or otherwise clearly contradicted by context. Moreover, one or more of the blocks and/or interactions described may be changed, eliminated, sub-divided, or combined; and disclosed processes may be carried out sequentially and/or carried out in parallel by, for example, separate processing threads, processors, devices, discrete logic, circuits, etc. The examples provided herein and the exemplary language (e.g., "such as" or "for example") used herein are intended merely to better illuminate the embodiments and does not pose a limitation on the scope of this disclosure unless otherwise claimed. In view of this disclosure, numerous modifications and adaptations will be readily apparent to those skilled in this art without departing from the spirit and scope of this disclosure.

While exemplary apparatus, methods, and articles of manufacture have been particularly shown and described with reference to exemplary embodiments thereof, it will be understood by those of ordinary skill in the art that various changes in form and details may be made therein without departing from the spirit and scope of this disclosure.

What is claimed is:

1. A digital photographing apparatus comprising a digital signal processor configured to:
   display at least a portion of a panoramic image as a sequence of images,
   wherein:
      the sequence of images are each to be displayed as magnified portions of the panoramic image, and are collectively bounded by a user-defined moving region set in the panoramic image,
      the moving region and the sequence of images are set prior to the display of any of the sequence of images, and
      each of the sequence of images is smaller than the moving region.

2. The digital photographing apparatus of claim 1, wherein the digital signal processor pauses display of the sequence of images for a predetermined period of time.

3. The digital photographing apparatus of claim 1, wherein the digital signal processor pauses display of the sequence of images for a predetermined period of time, and repeats displaying the sequence of images after the predetermined period of time elapses.

4. The digital photographing apparatus of claim 1, wherein the moving region is from a first image of the panoramic image to a user-defined spot in the panoramic image.

5. The digital photographing apparatus of claim 1, wherein the moving region is from a first user-defined spot to a second user-defined spot in the panoramic image.

6. The digital photographing apparatus of claim 1, wherein the digital signal processor receives a touch signal, and sets the moving region according to the touch signal.

7. The digital photographing apparatus of claim 1, wherein the digital signal processor receives a button input signal, and sets the moving region according to the button input signal.

8. The digital photographing apparatus of claim 1, wherein the digital signal processor comprises:
   a setting unit that sets the moving region in the panoramic image in response to a user input; and
   a slide reproducing unit that presents the sequence of images.

9. The digital photographing apparatus of claim 8, further comprising a pause unit that pauses display of the sequence of images for a predetermined period of time.

10. The digital photographing apparatus of claim 8, further comprising a speed adjusting unit that adjusts a reproduction speed of the sequence of images.

11. A method of controlling a digital photographing apparatus, the method comprising:
    setting a moving region in a panoramic image in response to a user input comprising a sequence of images that are each to be displayed as magnified portions of the panoramic image, and are collectively bounded by the moving region, wherein each of the sequence of images is smaller than the moving region;
    after the setting of the moving region and all of the sequence of images making up the moving region, displaying at least a portion of the panoramic image as a sequence of images.

12. The method of claim 11, wherein the moving region is from a first user-defined spot to a second user-defined spot in the panoramic image, or from a first image of the panoramic image to a third user-defined spot in the panoramic image.

13. The method of claim 11, wherein displaying the sequence of images comprises:

pausing display of the sequence of images for a predetermined period of time; and
displaying remaining images after the predetermined period of time elapses.

14. The method of claim 11, wherein displaying the sequence of images comprises:
pausing display of the sequence of images for a predetermined period of time; and
repeating displaying and pausing of remaining images by as much as the moving region after the predetermined period of time elapses.

15. The method of claim 11, further comprising:
receiving a touch signal; and
setting the moving region according to the touch signal.

16. The method of claim 11, further comprising:
receiving a button input signal; and
setting the moving region according to the button input signal.

17. A non-transitory computer-readable medium storing instructions that, when executed, cause a digital photographing apparatus to at least carry out the method of claim 11.

18. The digital photographing apparatus of claim 1, wherein the digital signal processor is further configured to:
receive an adjustment signal during the display of the sequence of images; and
adjust a display speed of the sequence of images according to the adjustment signal.

19. The method of claim 11, further comprising:
receiving an adjustment signal during the display of the sequence of images; and
adjusting a display speed of the sequence of images according to the adjustment signal.

* * * * *